(12) United States Patent
Janus et al.

(10) Patent No.: US 8,994,241 B2
(45) Date of Patent: Mar. 31, 2015

(54) REAL TIME COMPOSITION OF A COMPOSITE WINDOW FROM CONTENT MAINTAINING UNIQUE SECURITY DOMAINS

(71) Applicants: Scott Janus, Rocklin, CA (US); David R Sokolowski, Rocklin, CA (US)

(72) Inventors: Scott Janus, Rocklin, CA (US); David R Sokolowski, Rocklin, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/729,652

(22) Filed: Dec. 28, 2012

(65) Prior Publication Data

US 2014/0185802 A1 Jul. 3, 2014

(51) Int. Cl.
*H04N 7/167* (2011.01)
*H04L 9/12* (2006.01)
*H04L 9/14* (2006.01)

(52) U.S. Cl.
CPC .. *H04L 9/12* (2013.01); *H04L 9/14* (2013.01); *H04N 7/167* (2013.01); *H04L 2209/30* (2013.01); *H04L 2209/60* (2013.01)
USPC ......................................................... 310/210

(58) Field of Classification Search
CPC ............ H04N 7/1675; H04N 21/4405; H04N 21/2347

USPC ........................................................ 380/210
See application file for complete search history.

(56) References Cited

U.S. PATENT DOCUMENTS

2001/0036271 A1 * 11/2001 Javed ............................ 380/217
2007/0217603 A1 * 9/2007 Quinard ......................... 380/42
2009/0296929 A1 * 12/2009 Wachtfogel et al. .......... 380/213

* cited by examiner

*Primary Examiner* — Teshome Hailu
(74) *Attorney, Agent, or Firm* — Ryder, Lu, Mazzeo & Konieczny LLC; Douglas J. Ryder (57) ABSTRACT

In general, in one aspect, a multi-content composition pipeline encrypts protected video streams that may be utilized as part of a composite window using different encryption keys so that each encrypted video stream has a unique security domain. The protected video streams may be received as encrypted and compressed video streams that are decrypted and decoded (decompressed) and then the decompressed video streams may be encrypted. The encryption keys used to encrypt the decompressed video stream may be related to the encryption keys used to decrypt the corresponding encrypted compressed video stream. The encrypted decompressed video streams are stored in memory until they are needed for generating the composite window at which point they are read from memory and decrypted. The composite window is generated from the decrypted uncompressed video streams and possibly other content in real time and thus is not stored in memory prior to transmission to a display.

25 Claims, 7 Drawing Sheets

REAL TIME COMPOSITION OF A COMPOSITE WINDOW FROM CONTENT MAINTAINING UNIQUE SECURITY DOMAINS

BACKGROUND

Consumer electronics devices (CEDs) such as media players (e.g., iPod Touch®), smart phones (e.g., iPhone®, Blackberry®, Android® phone, Windows® phone), tablets (e.g., iPad®), computers (e.g., lap-tops, desk tops), and Internet enabled televisions may be able to access, receive, transmit, share, generate, store and/or present digital information (content). The CEDs may receive/access the content from, for example, other CEDs networked thereto, the Internet, other public/private networks, content sources (e.g., DVDs) and/or its internal memory. The content may include, for example, videos, graphics, and/or other forms of content (e.g., documents, web pages). The content may be encoded for protection, for example, premium videos that require a subscription to view and/or on-line confidential banking information. The CEDs may be capable of presenting a plurality of content at the same time (e.g., multiple videos, a video and graphics, video and a web page).

Premium and/or confidential content may be received by the CED in an encoded format. The encoded content may be decoded and then stored in graphics memory within the CED. The graphics memory may be randomly accessed which may enable a hacker to access the data therefrom (e.g., access premium videos, access confidential information). The CED may also receive content that is not encoded (e.g., non-premium, not confidential) and may store the content in the graphics memory. A plurality of content may be composed into a single composite window and the composite window may be stored in a frame buffer in the graphics memory. As noted above, the graphics memory may be hacked.

BRIEF DESCRIPTION OF THE DRAWINGS

The features and advantages of the various embodiments will become apparent from the following detailed description in which.

DETAILED DESCRIPTION

Figure 1:
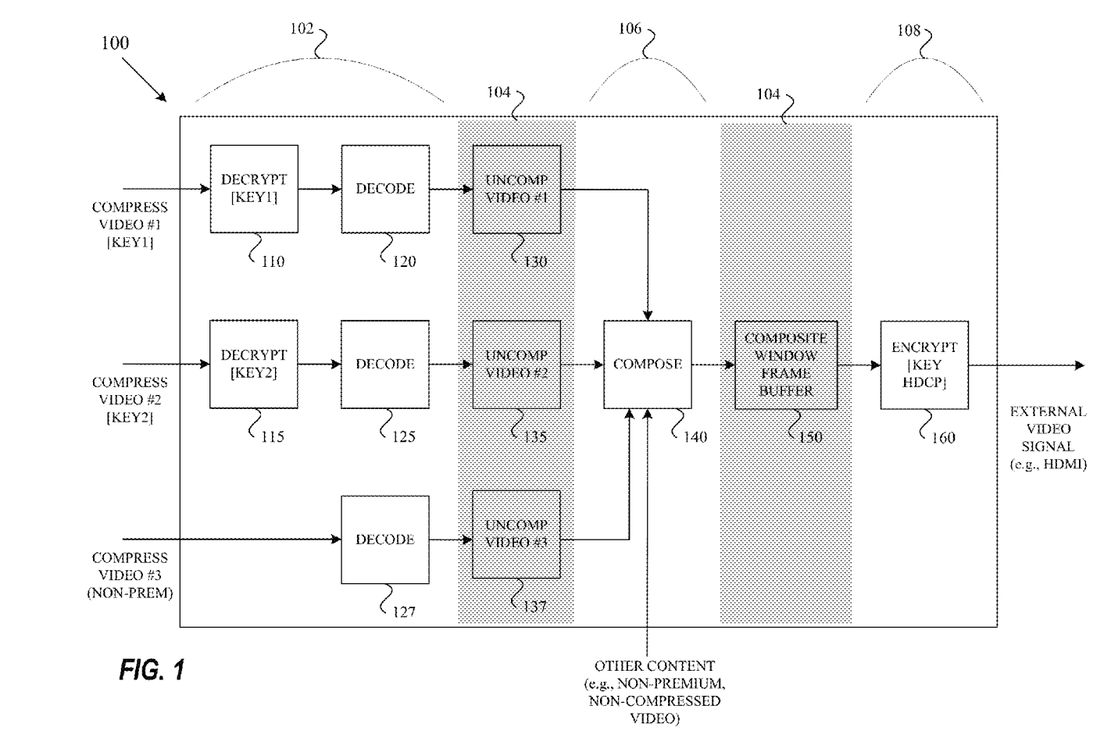
FIG. 1 illustrates a block diagram of an example multi-content composition pipeline that may be utilized in a consumer electronics device (CED)

FIG. 1 illustrates a block diagram of an example multi-content composition pipeline 100 that may be utilized in a consumer electronics device (CED) to generate a composite window for display. The composite window may utilize content from different sources (including a plurality of video streams). The video streams may come from, for example, a medium (e.g., disk) or a network (e.g., cable network, Internet). Some of the video streams may be protected and require some type of authorization to view and/or access. The authorization may be, for example, paying for a video stream (premium content) and/or confirming the age of a viewer of a video stream (age appropriate content). The video streams requiring authorization may be encoded with a specific security domain to prevent unauthorized users from viewing or having access thereto. The video streams may be in a compressed format for transmission or storage and need to be decompressed for viewing or accessing.

The pipeline 100 may include a media engine 102, graphic memory 104, a composite window (e.g., 3D) engine 106 and a display engine 108. The media engine 102 may decrypt and decode video streams. The composite window engine 106 may create a composite image (window) from different content. The display engine 108 may prepare the composite image for presentation on a display. The graphic memory 104 may store the various individual content and the composite image.

As illustrated, the media engine 102 is capable of receiving a total of three compressed video streams (video #1, video #2, video #3) two of which are encrypted. The encrypted video streams may be encrypted with unique encryption keys (key 1, key 2) and may be decrypted by decryption engines 110, 115 that have access to the encryption keys (e.g., provided when a premium video channel is purchased, provided if an authentic DVD is purchased). The compressed video streams may be decoded (decompressed) by decode engines 120, 125, 127. The uncompressed video streams 130, 135, 137 may be stored unencrypted in graphics memory 104.

The composite window engine 106 may retrieve the uncompressed video streams 130, 135, 137 from the graphics memory 104 as well as other content (e.g., non-premium video stream, non-compressed video stream, graphics) and may utilize a composition engine 140 to generate a composite window frame buffer 150 for display. It should be noted that the other content is illustrated as not being stored in the graphics memory 104 but that the other content may be stored therein. The composite window frame buffer 150 may include various different content (e.g., three videos) combined together in some fashion. For example, the various content may be displayed in different windows and the windows may be presented on different portions of the composite window, may overlap one another, or some combination thereof. The unencrypted composite window frame buffer 150 may be stored in the graphics memory 104.

The display engine 108 may retrieve the composite window frame buffer 150 and encrypt it utilizing an encryption engine 160 for transmission to a display. The encryption engine 160 may encrypt the composite window frame buffer 150 for transmission to the display utilizing, for example, High-bandwidth Digital Content Protection (HDCP) encryption. The display may utilize any of a number of display formats, for example, High-Definition Multimedia Interface (HDMI).

Each premium video stream enters the pipeline 100 with a unique hardware security domain (e.g., key 1, key 2) and the composite image leaves the system with a different hardware security domain (e.g., HDCP). However, between the decryption engines 110, 115 and the encryption engine 160 there is no hardware based security. The unencrypted buffers 130, 135, 150 may be protected via software. It is possible that the unencrypted video streams 130, 135 and the composite window frame buffer 150 may be accessed from the graphics memory 104 by unauthorized users.

In order to prevent access to the graphics memory 104 the content may be encrypted before it is written thereto and decrypted as it read therefrom. The encryption may be the same for each of the premium videos and the composite image (common security domain). The encryption may be an internal system encryption.

Figure 2:
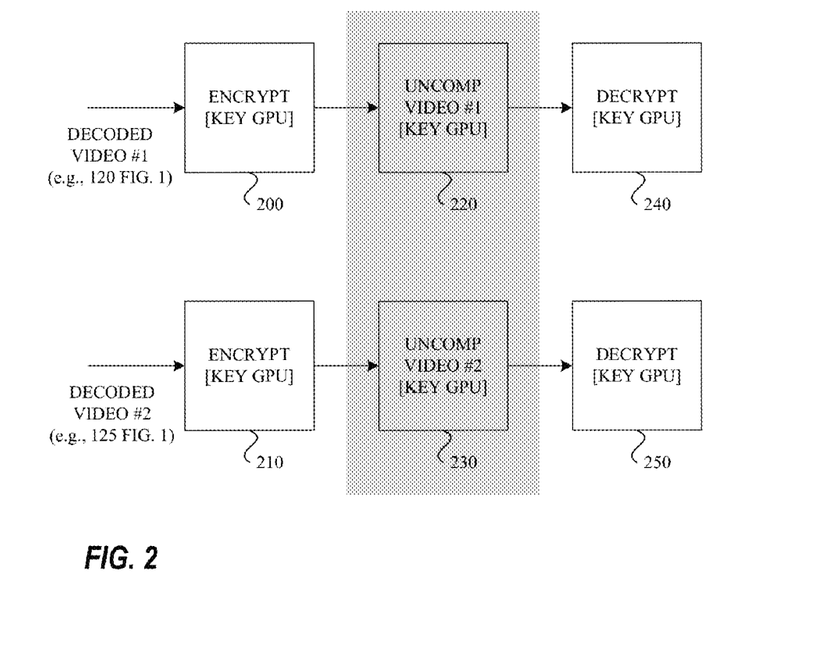
FIG. 2 illustrates an example flow for providing hardware-based security for video streams stored in graphics memory.

FIG. 2 illustrates an example flow for providing hardware-based security for video streams stored in graphics memory. The flow shows that decoded (uncompressed) and unencrypted video streams #1, #2 are received and encrypted by encryption engines 200, 210. The encryption engines 200, 210 may encrypt the video streams using the same encryption key (e.g., key GPU). The encryption key may be utilized internal to a system (e.g., graphics processor). The encrypted video streams 220, 230 may be stored in graphics memory. When the encrypted video streams 220, 230 are read from memory they may be decrypted by decryption engines 240, 250 utilizing the same key.

Figure 3:
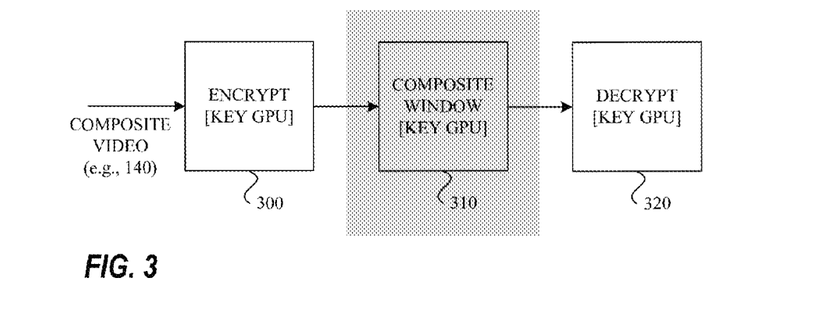
FIG. 3 illustrates an example flow for providing hardware-based security for a composite window frame buffer stored in graphics memory.

FIG. 3 illustrates an example flow for providing hardware-based security for a composite window frame buffer stored in graphics memory. The flow shows the unencrypted composite window frame buffer is received and encrypted by an encryption engine 300. The encryption engine 300 may encrypt the composite window frame buffer using a system encryption key (e.g., key GPU). The encrypted composite window frame buffer 310 may be stored in graphics memory. When the encrypted composite window frame buffer 310 is read from memory it may be decrypted by a decryption engine 320 utilizing the same key.

Figure 4:
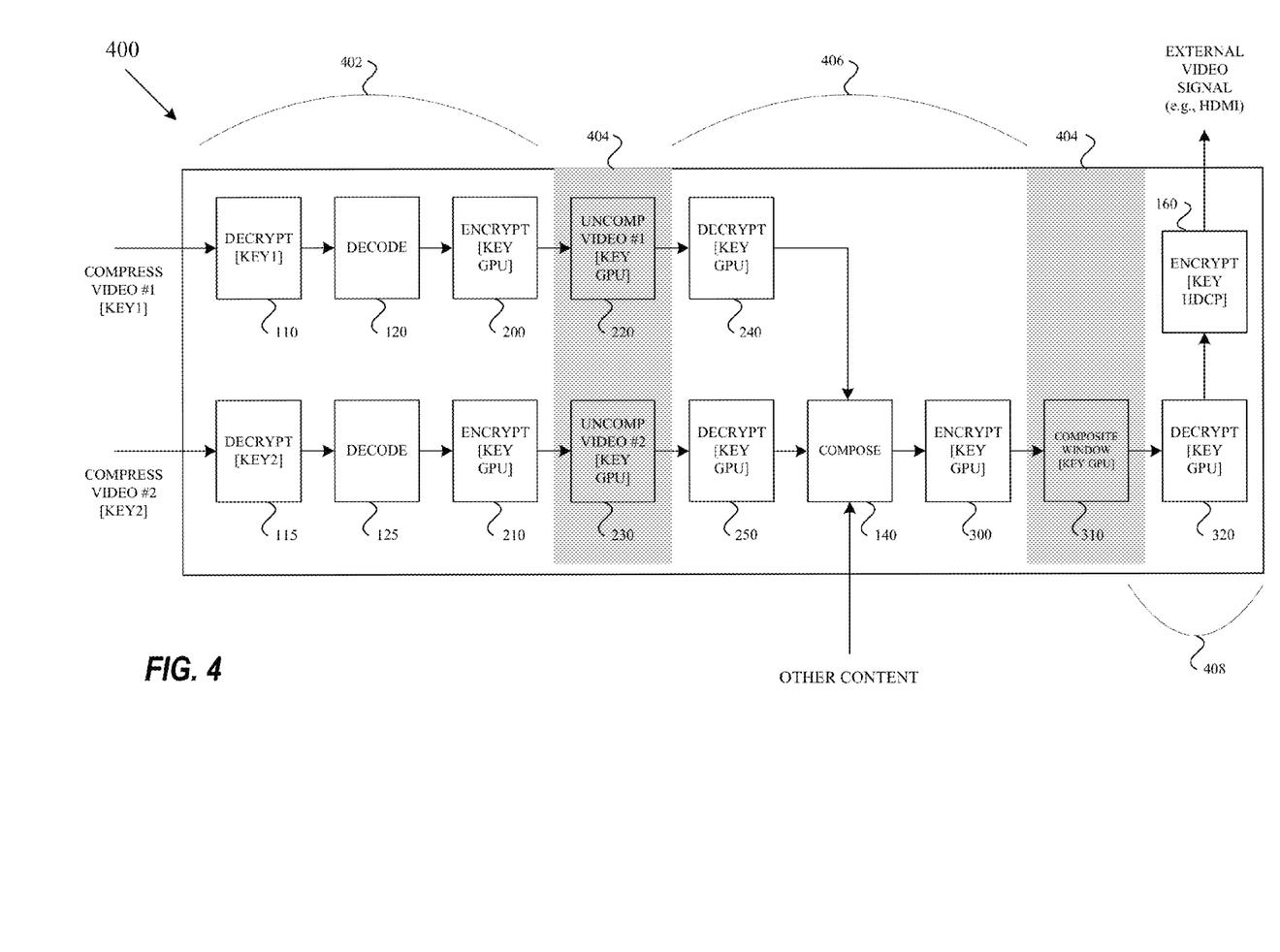
FIG. 4 illustrates a block diagram of an example multi-content composition pipeline providing end-to-end hardware based security.

FIG. 4 illustrates a block diagram of an example multi-content composition pipeline 400 providing end-to-end hardware based security. The pipeline 400 may include a media engine 402, graphic memory 404, a composite window (e.g., 3D) engine 406 and a display engine 408. The media engine 402 may receive encoded and encrypted video streams (key 1, key 2), decrypt the video streams with the decryption engines 110, 115 and decode (decompress) the video streams with the decode engines 120, 125. The decrypted and decoded video streams may be encrypted by encryption engines 200, 210 using the same encryption key (e.g., key GPU). The encrypted video streams 220, 230 may be stored in the graphics memory 404. While not illustrated, the media engine 402 may be capable of decoding additional compressed video streams that are not encrypted (e.g., 127 of FIG. 1) and the associated uncompressed video streams may be stored in the graphics memory 404.

The composite window engine 406 may retrieve the encrypted video streams 220, 230 from the graphics memory 404 and decrypt them with the decryption engines 240, 250. The composition engine 140 may generate a composite window frame buffer from the decrypted video streams and other content (e.g., non-premium) that may be retrieved. The composite window frame buffer may be encrypted using the encryption engine 300 and the encrypted composite window frame buffer 310 may be stored in the graphics memory 404.

The display engine 408 may retrieve the encrypted composite window frame buffer 310 from the graphics memory 404 and decrypt it using the decryption engine 320. The composite window frame buffer may then be encrypted by the encryption engine 160 for transmission to a display.

While the pipeline 400 may provide end-to-end hardware based security, storing the uncompressed video streams 220, 230 in the graphics memory 404 under a common security domain where all encryption/decryption is done with a common encryption key (key GPU) leaves the system vulnerable to certain attacks. A malicious application that utilizes known ciphertext-modifications and chosen plaintext approaches could be utilized. For example, the malicious application could be part of one of the video streams (e.g., video #1) and modify the ciphertext (encrypted buffers) for each of the uncompressed video streams 220, 230. The application could then use the known changes to video #1 to decrypt video #2 based on the changes made thereto.

In order to prevent these type of malicious attacks, it is desirable to utilize different security domains for each of the video streams that are temporarily stored within the graphics memory of the multi-content composition pipeline. The security domain for each of the video streams may utilize the encryption key of the incoming video. For added security a derivative of the incoming security key may be used. Once the incoming security key is known by the system (e.g., decryption engine 110), the key may be modified in some way to generate the derivative key. The key may be modified by, for example, the decryption engine 110, the encryption engine 200, some type of modification unit, or some combination thereof. The modification of the incoming security key may be simple or complex. The modification to each security key (e.g., key 1, key 2) may be the same or the modification may be unique for each security key (e.g., key 1 modified by or according to A, key 2 modified by or according to B where A and B are different modification parameters or modification flows).

Figure 5:
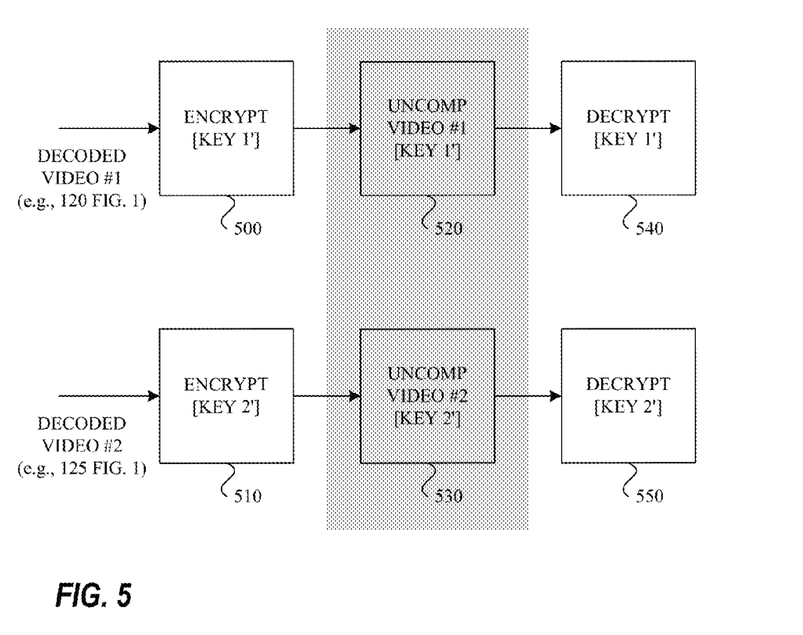
FIG. 5 illustrates an example flow for providing unique hardware-based security for video streams stored in graphics memory, according to one embodiment.

FIG. 5 illustrates an example flow for providing unique hardware-based security for video streams stored in graphics memory. The flow shows that decoded (uncompressed) and unencrypted video streams #1, #2 are received and encrypted by encryption engines 500, 510. The encryption engine 500 may encrypt video stream 1 using a derivative (key 1') of the incoming encryption key (key 1) and the encryption engine 510 may encrypt the video stream 2 using a derivative (key 2') of the incoming encryption key (key 2). The derived encryption keys (key 1', key 2') may be provided to the encryption engines 500, 510, the encryption keys (key 1, key 2) may be provided to the encryption engines 500, 510 and the encryption engines 500, 510 may generate the derived encryption keys (key 1', key 2') or some combination thereof. The encrypted video streams 520, 530 may be stored in graphics memory. When the encrypted video streams 520, 530 are read from memory they may be decrypted by decryption engines 540, 550 utilizing the derived encryption keys (key 1', key 2').

Use of the derived encryption keys (key 1', key 2') in a multi-content composition pipeline to maintain a separate security domain for each video stream prevents malicious attacks utilizing known ciphertext-modifications and chosen plaintext approaches.

The composite window frame buffer generated from the decrypted video streams and other content (e.g., non-premium) in the multi-content composition pipeline does not have an incoming encryption key to utilize or modify for encryption prior to storing in graphics memory. One of the derived security keys (e.g., key 1', key 2') could be utilized to encrypt the composite window frame buffer. However, using the same security domain for different content may open the system up for attack. Therefore, the composite window frame buffer may be encrypted with a system key (e.g., key GPU). Alternatively, the composite window frame buffer may be encrypted with a derivative of one or more of the derived keys (e.g., key 1", key 2", key 1/key 2').

The use of different security domains for the incoming video streams (e.g., derived encryption keys) and the composite window frame buffer (e.g., system encryption key, further derived encryption key) provides an end-to-end hardware based security. However, the system requires the encryption and decryption of individual content (e.g., video streams 1, 2) stored in graphics memory as well as the encryption and decryption of the composite window frame buffer.

Moreover, electronic code book (ECB) encryption is the common encryption utilized in graphics processors as it is relatively easy to implement and is sufficient to protect the video streams as the images presented are distorted and make the overall experience of watching the video stream not enjoyable even though some of the images presented therein may be clearly visible (e.g., can make out characters). However, a problem with ECB encryption is that it does a poor job of hiding patterns so that if the other content being combined into the composite window frame buffer includes text or static images it may be visible to the human eye and/or optical character recognition (OCR) products if a hacker accesses the composite window frame buffer stored in the graphics memory. For example, confidential information may utilize digital signatures to ensure the content displayed is the same as the content generated and transmitted thereto. The use of the digital signature is to ensure the content cannot be changed, either by accident or by intent, this is often referred to as what you see is what you sign (WYSIWYS).

If some of the content included in the composite window frame buffer (e.g., other content) included WYSIWYS confidential information (e.g., on-line banking information, on-line secure document viewing) a hacker accessing the composite window frame buffer from graphics memory may be able to capture portions of the confidential information (e.g., bank account number) from the ECB encrypted graphics memory.

Generating the composite window frame buffer in real time would eliminate the need for storing the composite window frame buffer in graphics memory. Eliminating the composite window frame buffer from the graphics memory would accordingly eliminate the need to encrypt and decrypt the composite window frame buffer. Furthermore, it would eliminate the ability of a hacker to capture confidential information from the encrypted contents stored in the graphics memory.

Figure 6:
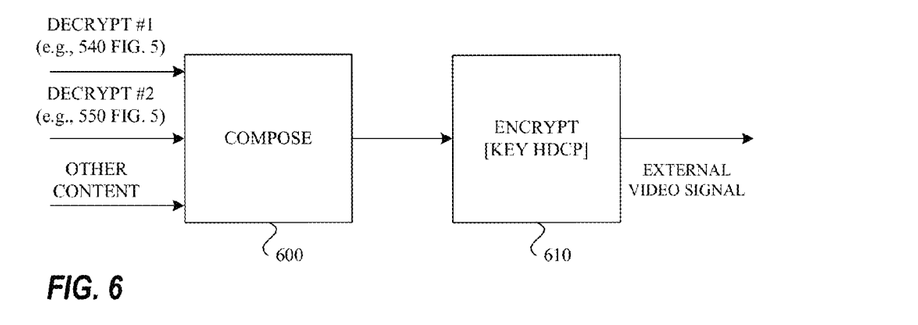
FIG. 6 illustrates an example flow for generating a composite window frame buffer in real time and preparing it for transmission to a display, according to one embodiment.

FIG. 6 illustrates an example flow for generating a composite window frame buffer in real time and preparing it for transmission to a display. The flow shows that the unencrypted video streams #1, #2 and the other content are received by a composition engine 600 that may generate the composite window frame buffer. The composite window frame buffer is then provided to an encryption engine 610 that may encrypt the composite window frame buffer for transmission as an external video signal. The encryption engine 610 may utilize an external transmission encryption key (e.g., key HDCP). The encrypted composite window frame buffer may be transmitted as an external video signal.

Figure 7:
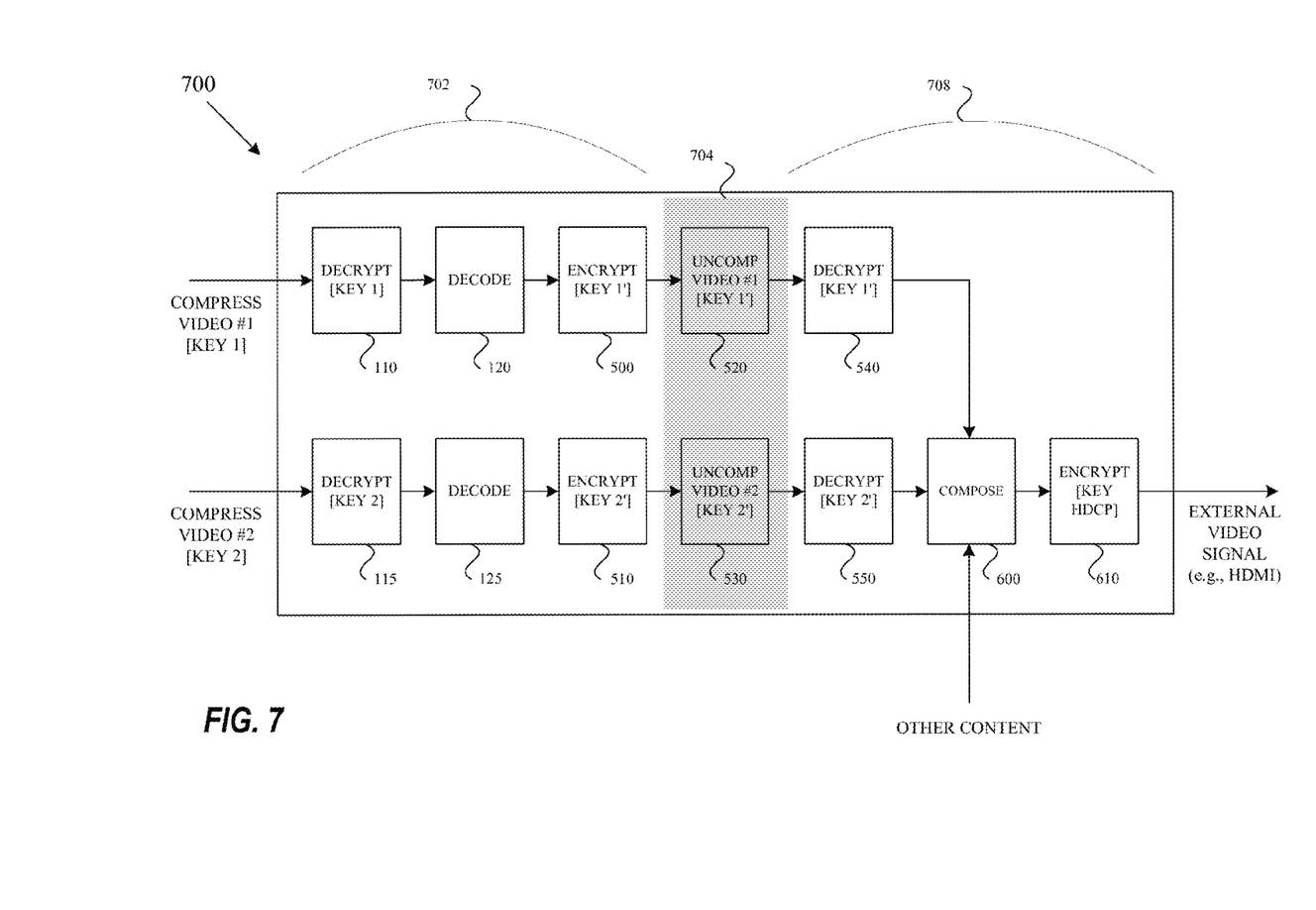
FIG. 7 illustrates a block diagram of an example multi-content composition pipeline providing individual hardware based security domains that is not susceptible to pattern recognition of encrypted confidential information, according to one embodiment.

FIG. 7 illustrates a block diagram of an example multi-content composition pipeline 700 providing individual hardware based security domains that is not susceptible to pattern recognition of encrypted confidential information (WYSI-WYS). The pipeline 700 may include a media engine 702, graphic memory 704, and a real-time display engine 708. The media engine 702 may receive encoded and encrypted video streams (key 1, key 2), decrypt the video streams with the decryption engines 110, 115 and decode (decompress) the video streams with the decode engines 120, 125. The decrypted and decoded video streams may be encrypted by encryption engines 500, 510 using the incoming encryption key or a derivative thereof (e.g., key 1', key 2'). The encrypted video streams 520, 530 may be stored in the graphics memory 704.

The real-time display engine 708 may retrieve the encrypted video streams 520, 530 from the graphics memory 604 and decrypt them with by the decryption engines 540, 550. A composition engine 600 may generate a composite window frame buffer from the decrypted video streams and other content in real-time as it is needed for displaying of the composite window frame buffer. The composite window frame buffer need not be stored in graphics memory and may only exist ephemerally in the display engine 708. Accordingly, the content may not be accessed from the graphics memory by a hacker. The composite window frame buffer may then be encrypted by the encryption engine 610 for transmission to a display.

The pipeline 700 reduces the attack surface by using separate security domains (e.g., derived encryption keys) to protect the individual video streams to prevent a malicious application from coherently modifying the secrets of other content (security domains). Furthermore, the pipeline 700 reduces the attack surface by not storing the composite window frame buffer (in either non-encrypted or encrypted format) in graphics memory so that patterns associated with confidential images contained therein cannot be recognized and/or captured. The use of the real-time display engine 708 also enables the pipeline 700 to reduce the number of encrypt/decrypt operations that must be performed which may reduce the system footprint and system power consumption. Moreover, since the frame buffer need not be stored in memory the memory footprint associated with the system may also be reduced.

The multi-content composition pipeline with hardware-based security disclosed with respect to FIGS. 2-7 may be implemented in whole or in part, in a central processing unit (CPU), a graphics processing unit (GPU), a system on a chip (SOC), one or more discrete components, or some combination thereof. Furthermore, the operations described with respect to FIGS. 2-7 may be implemented in hardware, software, firmware or some combination thereof. The CPU, GPU, and/or SOC may have access to device readable storage (on the device, off the device, or some combination thereof) that contains instructions that when executed by the device causes the device to perform at least a subset of the operations described above in FIGS. 2-7. The graphics memory may be internal to the CPU, GPU, and/or SOC or may be external and accessed thereby.

The various embodiments described above may be implemented in various systems that display content (content display systems) and the content display systems may be incorporated in various devices.

Figure 8:
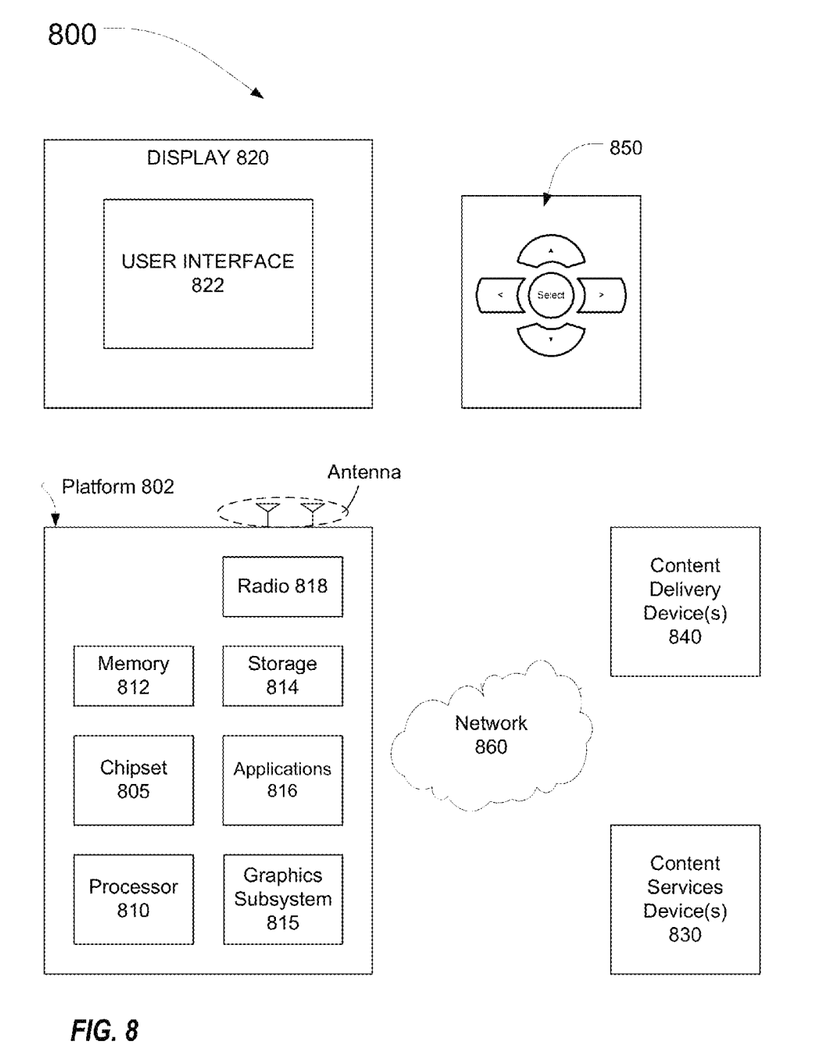
FIG. 8 illustrates an example content display system, according to one embodiment.

FIG. 8 illustrates an example content display system 800. The system 800 may be a media system although it is not limited to this context. The system 800 may be incorporated into, for example, a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 800 comprises a platform 802 coupled to an external display 820. The platform 802 may receive content from a content device such as content services device(s) 830, content delivery device(s) 840 or other similar content sources. A navigation controller 850 comprising one or more navigation features may be used to interact with, for example, the platform 902 and/or the display 820.

In embodiments, the platform 802 may comprise any combination of a chipset 805, a processor 810, memory 812, storage 814, a graphics subsystem 815, applications 816 and/or a radio 818. The chipset 805 may provide intercommunication among the processor 810, the memory 812, the storage 814, the graphics subsystem 815, the applications 816 and/or the radio 818. The chipset 805 may, for example, include a storage adapter (not depicted) capable of providing intercommunication with the storage 814.

The processor 810 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 810 may comprise dual-core processor(s), dual-core mobile processor(s), and so forth.

The memory 812 may be implemented as a volatile memory device such as, but not limited to, a Random Access Memory (RAM), Dynamic Random Access Memory (DRAM), or Static RAM (SRAM).

The storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, the storage 814 may comprise technology to increase the storage performance or enhanced protection for valuable digital media when multiple hard drives are included, for example.

The graphics subsystem 815 may perform processing of images such as still or video for display. The graphics subsystem 815 may be a graphics processing unit (GPU) or a visual processing unit (VPU), for example. An analog or digital interface may be used to communicatively couple the graphics subsystem 815 and the display 820. For example, the interface may be any of a High-Definition Multimedia Interface, DisplayPort, wireless HDMI, and/or wireless HD compliant techniques. The graphics subsystem 815 could be integrated into the processor 810 or the chipset 805. The graphics subsystem 815 could be a stand-alone card communicatively coupled to the chipset 805.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, the radio 818 may operate in accordance with one or more applicable standards in any version.

In embodiments, the display 820 may comprise any television type monitor or display. The display 820 may comprise, for example, a computer display screen, touch screen display, video monitor, television-like device, and/or a television. The display 820 may be digital and/or analog. In embodiments, the display 820 may be a holographic display. Also, the display 820 may be a transparent surface that may receive a visual projection. Such projections may convey various forms of information, images, and/or objects. For example, such projections may be a visual overlay for a mobile augmented reality (MAR) application. Under the control of one or more software applications 816, the platform 802 may display the user interface 822 on the display 820.

In embodiments, the content services device(s) 830 may be hosted by any national, international and/or independent service and thus accessible to the platform 802 via the Internet, for example. The content services device(s) 830 may be coupled to the platform 802 and/or to the display 820. The platform 802 and/or the content services device(s) 830 may be coupled to a network 860 to communicate (e.g., send and/or receive) media information to and from the network 860. The content delivery device(s) 840 also may be coupled to the platform 802 and/or to the display 820.

In embodiments, the content services device(s) 830 may comprise a cable television box, personal computer, network, telephone, Internet enabled devices or appliance capable of delivering digital information and/or content, and any other similar device capable of unidirectionally or bidirectionally communicating content between content providers and the platform 802 and/or the display 820, via the network 860 or directly. It will be appreciated that the content may be communicated unidirectionally and/or bidirectionally to and from any one of the components in the system 800 and a content provider via the network 860. Examples of content may include any media information including, for example, video, music, medical, gaming information, and so forth.

The content services device(s) 830 receives content such as cable television programming including media information, digital information, and/or other content. Examples of content providers may include any cable or satellite television or radio or Internet content providers. The provided examples are not meant to limit embodiments of the invention.

In embodiments, the platform 802 may receive control signals from navigation controller 850 having one or more navigation features. The navigation features of the controller 850 may be used to interact with the user interface 822, for example. In embodiments, the navigation controller 850 may be a pointing device that may be a computer hardware component (specifically human interface device) that allows a user to input spatial (e.g., continuous and multi-dimensional) data into a computer. Many systems such as graphical user interfaces (GUI), televisions and monitors allow the user to control and provide data to the computer or television using physical gestures.

Movements of the navigation features of the controller 850 may be echoed on a display (e.g., display 820) by movements of a pointer, cursor, focus ring, or other visual indicators displayed on the display. For example, under the control of software applications 816, the navigation features located on the navigation controller 850 may be mapped to virtual navigation features displayed on the user interface 822, for example. In embodiments, the controller 850 may not be a separate component but integrated into the platform 802 and/ or the display 820. Embodiments, however, are not limited to the elements or in the context shown or described herein.

In embodiments, drivers (not shown) may comprise technology to enable users to instantly turn on and off the platform 802 like a television with the touch of a button after initial boot-up, when enabled, for example. Program logic may allow the platform 802 to stream content to media adaptors or other content services device(s) 830 or content delivery device(s) 840 when the platform is turned "off" In addition, the chipset 805 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 800 may be integrated. For example, the platform 802 and the content services device(s) 830 may be integrated, or the platform 802 and the content delivery device(s) 840 may be integrated, or the platform 802, the content services device(s) 830, and the content delivery device(s) 840 may be integrated, for example. In various embodiments, the platform 802 and the display 820 may be an integrated unit. In various embodiments, the display 820 and the content service device(s) 830 may be integrated, or the display 820 and the content delivery device(s) 840 may be integrated, for example. These examples are not meant to limit the invention.

In various embodiments, the system 800 may be implemented as a wireless system, a wired system, or a combination of both. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
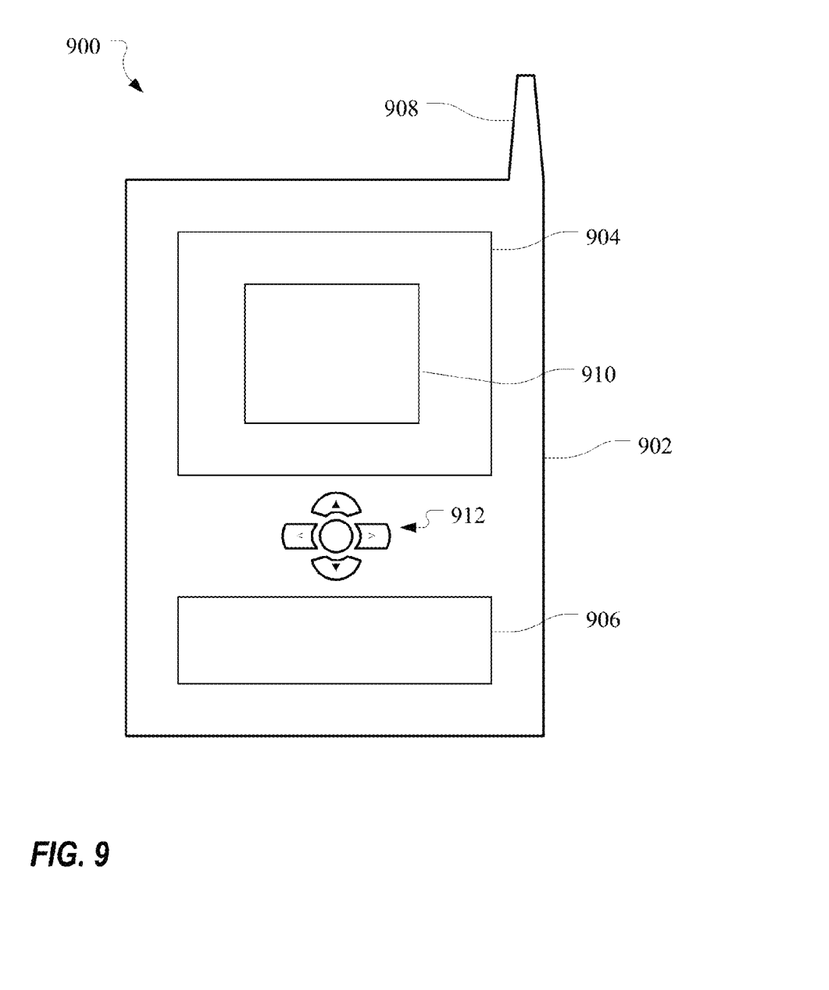
FIG. 9 illustrates an example small form factor device in which the system of FIG. 8 may be embodied, according to one embodiment.

As described above, the system 800 may be embodied in varying physical styles or form factors. FIG. 9 illustrates embodiments of a small form factor device 900 in which the system 800 may be embodied. In embodiments, for example, the device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example the mobile computing device may be utilized in a vehicle (e.g., car, truck, van). The in-vehicle device may provide information and/or entertainment to occupants of the vehicle (in-vehicle infotainment (IVI) device). The IVI device may utilize power from the vehicle as an external power source in addition to, or in place of, an internal battery powering the device.

In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The device 900 may comprise a housing 902, a display 904, an input/output (I/O) device 906, and an antenna 908. The device 900 also may comprise navigation features 912. The display 904 may comprise any suitable display unit for displaying information appropriate for a mobile computing device. The I/O device 906 may comprise any suitable I/O device for entering information into a mobile computing device. Examples for the I/O device 906 may include an alphanumeric keyboard, a numeric keypad, a touch pad, input keys, buttons, switches, rocker switches, microphones, speakers, voice recognition device and software, and so forth. Information also may be entered into the device 900 by way of microphone. Such information may be digitized by a voice recognition device. The embodiments are not limited in this context. The device 900 may include a battery (not illustrated) to provide power thereto. The battery may be located in the device 900 (e.g., within the housing 902) and/or may be remote from the device 900 (e.g., vehicle battery utilized for IVI device).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising:
receiving a plurality of encrypted compressed video streams;
decrypting the plurality of encrypted compressed video streams to generate a plurality of decrypted compressed video streams, wherein a unique encryption key is utilized to decrypt each of the plurality of encrypted compressed video streams;
decoding the plurality of decrypted compressed video streams to generate a plurality of decompressed video streams;
encrypting the plurality of decompressed video streams to generate a plurality of encrypted video streams, wherein a unique encryption key is utilized to encrypt each of the plurality of decompressed video streams so that each of the plurality of encrypted video streams has a unique security domain;
storing the plurality of encrypted video streams in memory;
retrieving at least one of the plurality of encrypted video streams from the memory to be presented in a composite window, wherein the composite window includes a plurality of content displayed together in some fashion;
decrypting the at least one of the plurality of encrypted video streams to generate at least one decrypted video stream; and
generating the composite window to include the at least one decrypted video stream.

2. The method of claim 1, wherein the unique encryption keys utilized to encrypt the plurality of decompressed video streams are the unique encryption keys utilized to decrypt corresponding ones of the plurality of encrypted compressed video streams.

3. The method of claim 1, wherein the unique encryption keys utilized to encrypt the plurality of decompressed video streams are derivatives of the unique encryption keys utilized to decrypt the corresponding ones of the plurality of encrypted compressed video streams.

4. The method of claim 1, wherein the composite window is not stored in memory.

5. The method of claim 1, further comprising transmitting the composite window to a display for presentation.

6. The method of claim 1, further comprising
encrypting the composite window; and
transmitting the encrypted composite window to a display for presentation.

7. The method of claim 1, wherein the generating the composite window includes generating the composite window from the at least the one decrypted video stream and other content.

8. The method of claim 7, wherein the other content includes graphics.

9. The method of claim 7, wherein the other content includes at least one non-protected video stream.

10. A multi-content composition pipeline comprising:
a media engine to
decrypt a plurality of encrypted compressed video streams received to generate a plurality of decrypted compressed video streams, wherein a unique encryption key is utilized to decrypt each of the plurality of encrypted compressed video streams,
decode the plurality of decrypted compressed video streams to generate a plurality of uncompressed video streams, and
encrypt the plurality of uncompressed video streams to generate a plurality of encrypted uncompressed video streams, wherein a unique encryption key is utilized to encrypt each of the plurality of uncompressed video streams so that each of the plurality of encrypted uncompressed video streams has a unique security domain;
memory to store the plurality of encrypted uncompressed video streams; and
a display engine to
retrieve at least one of the plurality of encrypted uncompressed video streams from the memory to be presented in a composite window, wherein the composite window includes a plurality of content displayed together in some fashion,
decrypt the at least one of the plurality of encrypted uncompressed video streams to generate at least one decrypted uncompressed video stream, and
generate the composite window to include the at least one decrypted uncompressed video stream.

11. The pipeline of claim 10, wherein the unique encryption keys utilized to encrypt the plurality of uncompressed video streams are the unique encryption keys utilized to decrypt corresponding ones of the plurality of encrypted compressed video streams.

12. The pipeline of claim 10, wherein the unique encryption keys utilized to encrypt the plurality of uncompressed video streams are derivatives of the unique encryption keys utilized to decrypt the corresponding ones of the plurality of encrypted compressed video streams.

13. The pipeline of claim 10, wherein the media engine includes
   at least one decryption engine to decrypt at least one encrypted compressed video stream;
   at least one decode engine to decode at least one decrypted compressed video stream; and
   at least one encryption engine to encrypt at least one uncompressed video stream.

14. The pipeline of claim 10, wherein the display engine does not store the composite window in memory.

15. The pipeline of claim 10, wherein the display engine is further to transmit the composite window to a display for presentation.

16. The pipeline of claim 10, wherein the display engine is further to
   encrypt the composite window; and
   transmit the encrypted composite window to a display for presentation.

17. The pipeline of claim 10, wherein the display engine includes
   at least decryption engine to decrypt at least one encrypted uncompressed video stream; and
   a window composition engine to generate the composite window.

18. The pipeline of claim 17, wherein the window composition engine is to generate the composite window from at least one decrypted uncompressed video stream and other content.

19. The pipeline of claim 10, wherein the display engine is to generate the composite window to include a plurality of windows, wherein the at least one decrypted uncompressed video stream is included in one of the plurality of windows.

20. The pipeline of claim 19, wherein the display engine is to generate the composite window to include the plurality of windows presented on different portions of the composite window.

21. The pipeline of claim 19, wherein the display engine is to generate the composite window to include the plurality of windows overlapping.

22. A system comprising:
   a video source to provide a plurality of encrypted compressed video streams;
   a host processor; and
   a multi-content composition pipeline including:
      a media engine to
         decrypt the plurality of encrypted compressed video streams received to generate a plurality of decrypted compressed video streams, wherein a unique encryption key is utilized to decrypt each of the plurality of encrypted compressed video streams,
         decode the plurality of decrypted compressed video streams to generate a plurality of uncompressed video streams, and
         encrypt the plurality of uncompressed video streams to generate a plurality of encrypted uncompressed video streams, wherein a unique encryption key is utilized to encrypt each of the plurality of uncompressed video streams so that each of the plurality of encrypted uncompressed video streams has a unique security domain;
      memory to store the plurality of encrypted uncompressed video streams; and
      a display engine to
         retrieve at least one of the plurality of encrypted uncompressed video streams from the memory to be presented in a composite window, wherein the composite window includes a plurality of content displayed together in some fashion,
         decrypt the at least one encrypted uncompressed video stream, and
         generate the composite window to include the at least decrypted uncompressed video stream.

23. The system of claim 22, wherein the display engine is further to
   encrypt the composite window; and
   transmit the encrypted composite window to a display for presentation, wherein neither the composite window nor the encrypted composite window is stored in memory.

24. A non-transitory processor readable storage medium storing instructions, wherein when the instructions are executed by the processor they cause the processor to:
   receive a plurality of encrypted compressed video streams;
   decrypt the plurality of encrypted compressed video streams to generate a plurality of decrypted compressed video streams, wherein a unique encryption key is utilized to decrypt each of the plurality of encrypted compressed video streams;
   decode the plurality of decrypted compressed video streams to generate a plurality of decompressed video streams;
   encrypt the plurality of decompressed video streams to generate a plurality of encrypted video streams, wherein a unique encryption key is utilized to encrypt each of the plurality of decompressed video streams so that each of the plurality of encrypted video streams has a unique security domain;
   store the plurality of encrypted video streams in memory;
   retrieve at least one of the plurality of encrypted video streams from the memory to be presented in a composite window, wherein the composite window includes a plurality of content displayed together in some fashion;
   decrypt the at least one of the plurality of encrypted video streams to generate at least one decrypted video stream; and
   generate the composite window to include the at least one decrypted video stream.

25. The non-transitory processor readable storage medium of claim 24, wherein when the instructions are executed by the processor they further cause the processor to
   encrypt the composite window; and
   transmit the encrypted composite window to a display for presentation.

* * * * *